United States Patent [19]

White

[11] Patent Number: 5,327,753
[45] Date of Patent: Jul. 12, 1994

[54] ANTI-THEFT DEVICE FOR A PLURALITY OF VEHICLE STEERING WHEEL CONFIGURATIONS

[75] Inventor: John M. White, Vienna, Va.
[73] Assignee: Rally Accessories, Inc., Miami, Fla.
[21] Appl. No.: 14,732
[22] Filed: Feb. 8, 1993
[51] Int. Cl.⁵ .................................................. B60R 25/02
[52] U.S. Cl. ........................................ 70/209; 70/226
[58] Field of Search ................ 70/209, 211, 212, 225, 70/226, 237, 238

[56] References Cited

U.S. PATENT DOCUMENTS

| | | |
|---|---|---|
| D. 289,491 | 4/1987 | Johnson . |
| D. 306,252 | 2/1990 | Johnson . |
| D. 306,253 | 2/1990 | Solow . |
| D. 323,611 | 2/1992 | Jan et al. . |
| 3,462,982 | 8/1969 | Moore . |
| 3,742,743 | 7/1973 | Stoyanovitch ......................... 70/209 |
| 4,103,524 | 8/1978 | Mitchell et al. . |
| 4,738,127 | 4/1988 | Johnson . |
| 4,856,308 | 8/1989 | Johnson . |
| 4,887,443 | 12/1989 | Wang . |
| 4,935,047 | 6/1990 | Wu . |
| 5,014,529 | 5/1991 | Wu . |
| 5,024,069 | 6/1991 | Hull, Jr. et al. . |
| 5,107,691 | 4/1992 | Wu . |
| 5,197,308 | 3/1993 | Pazik ..................... 70/209 |
| 5,222,381 | 6/1993 | Wilcox .................... 70/209 |

FOREIGN PATENT DOCUMENTS

| | | |
|---|---|---|
| 402771 | 12/1967 | Australia . |
| 2718291 | 10/1978 | Fed. Rep. of Germany . |
| 2037680 | 7/1980 | United Kingdom .................. 70/212 |

Primary Examiner—Peter M. Cuomo
Assistant Examiner—Darnell Boucher
Attorney, Agent, or Firm—Longacre & White

[57] ABSTRACT

The present disclosure concerns anti-theft devices which inhibit rotation of vehicle steering wheels. According to the present invention, an anti-theft device includes a plurality of generally parallel projections which are asymmetrically laterally spaced with respect to one another. Selecting one of the asymmetrical spacing patterns allows the anti-theft device to be optimally fitted to a given steering wheel.

6 Claims, 3 Drawing Sheets

ANTI-THEFT DEVICE FOR A PLURALITY OF VEHICLE STEERING WHEEL CONFIGURATIONS

BACKGROUND OF THE INVENTION a) Field of the Invention

The invention concerns anti-theft devices which inhibit rotation of vehicle steering wheels. In particular, the present invention concerns the attachment of anti-theft devices to steering wheels of various configurations.

b) Description of Related Art

A variety of anti-theft devices for attachment to vehicle steering wheels are known. For example, U.S. Pat. Nos. 4,738,127 to Johnson, 4,304,110 to Fain, 4,103,524 to Mitchell et al., 3,807,779 to Enders, 3,742,743 to Stoyanovitch, 3,664,164 to Zaidener, and 3,462,982 to Moore use a pair of U-shaped hooks to engage diametrically opposite points of a steering wheel. The U-shaped hooks are telescopically related and include a lock for securing the relative telescopic position. In each instance, the lateral spacing between the arms of the U-shaped hooks is arbitrarily selected large enough to universally accommodate most grip diameters of a plurality of vehicle steering wheels. In this disclosure, grip diameter refers to the diameter, measured parallel to the axis of the steering column, of an annular steering wheel as gripped in the vehicle operator's hand. Consequently, the known anti-theft devices generally fit the steering wheel so loosely as to enable the U-shaped portion at an end of the anti-theft device to be manipulated (e.g. oscillated such that the arms of the U-shaped hooks contact the axially facing, relative to the steering column axis, surfaces of the steering wheel). It has been observed that this disadvantage in the prior art provides fulcrum points for prying the anti-theft device off the steering wheel, and/or breaking the steering wheel so as to remove the anti-theft device.

SUMMARY OF THE INVENTION

An objective of the present invention is to provide an optimally fitting anti-theft device for vehicle steering wheels of varying circumferences and grip diameters.

Another objective of the present invention is to provide an anti-theft device for vehicle steering wheels comprising a plurality of generally parallel projections which are asymmetrically laterally spaced with respect to one another. Selecting one of the asymmetrical spacing patterns allows the anti-theft device to be optimally fitted to a given steering wheel.

Yet another objective of the present invention is to provide a blocking portion, i.e. that portion of the anti-theft device which contacts an interior element, which is obliquely reconfigured. The present invention is anatomically correct and improves the characteristics of the contact between the blocking portion and interior elements such as a console, a door, windows, an armrest, a seat, etc.

DESCRIPTION OF THE PREFERRED EMBODIMENT

Figure 1:
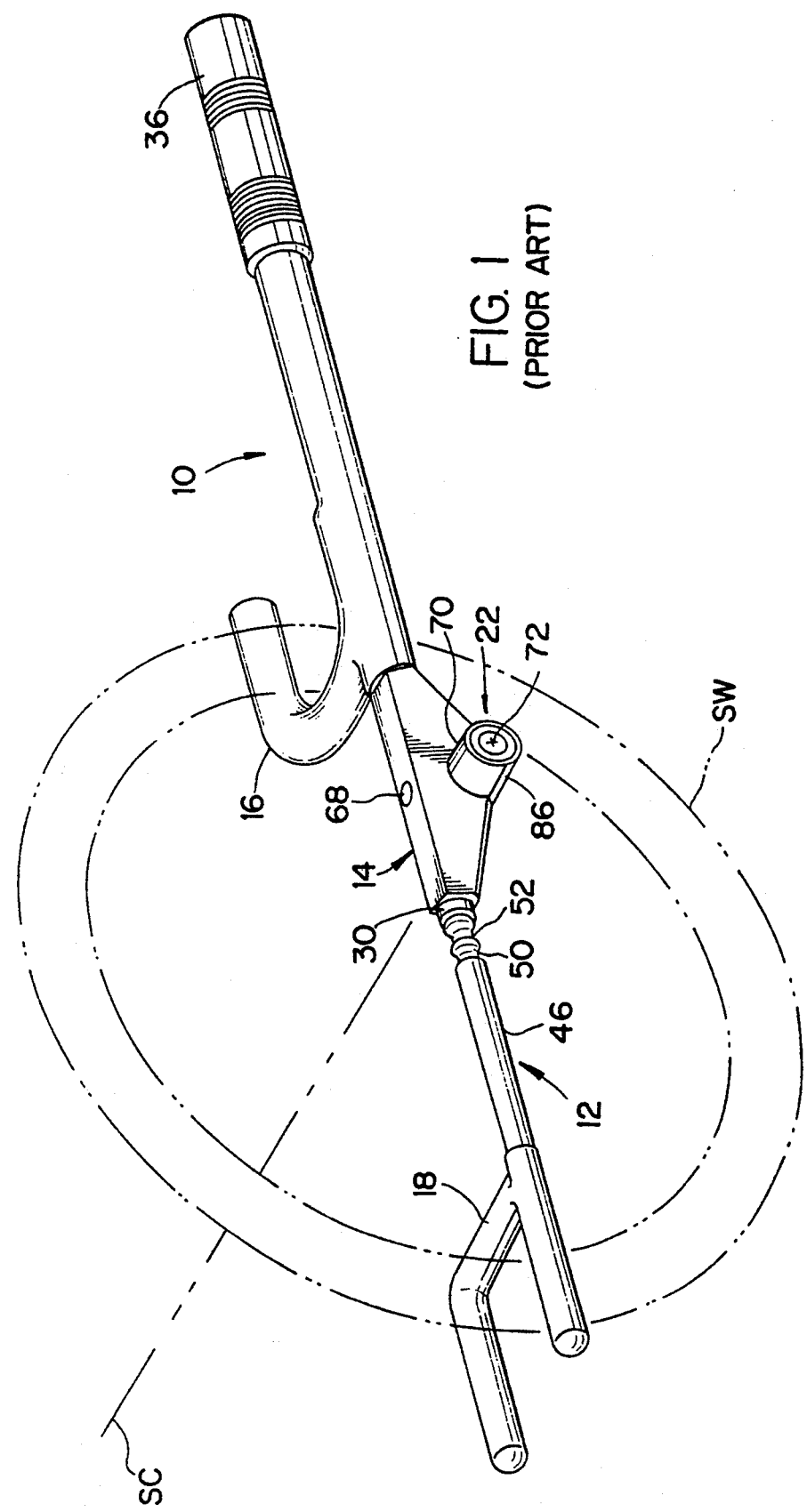
FIG. 1 shows a known anti-theft device for vehicle steering wheels.
Figure 2:
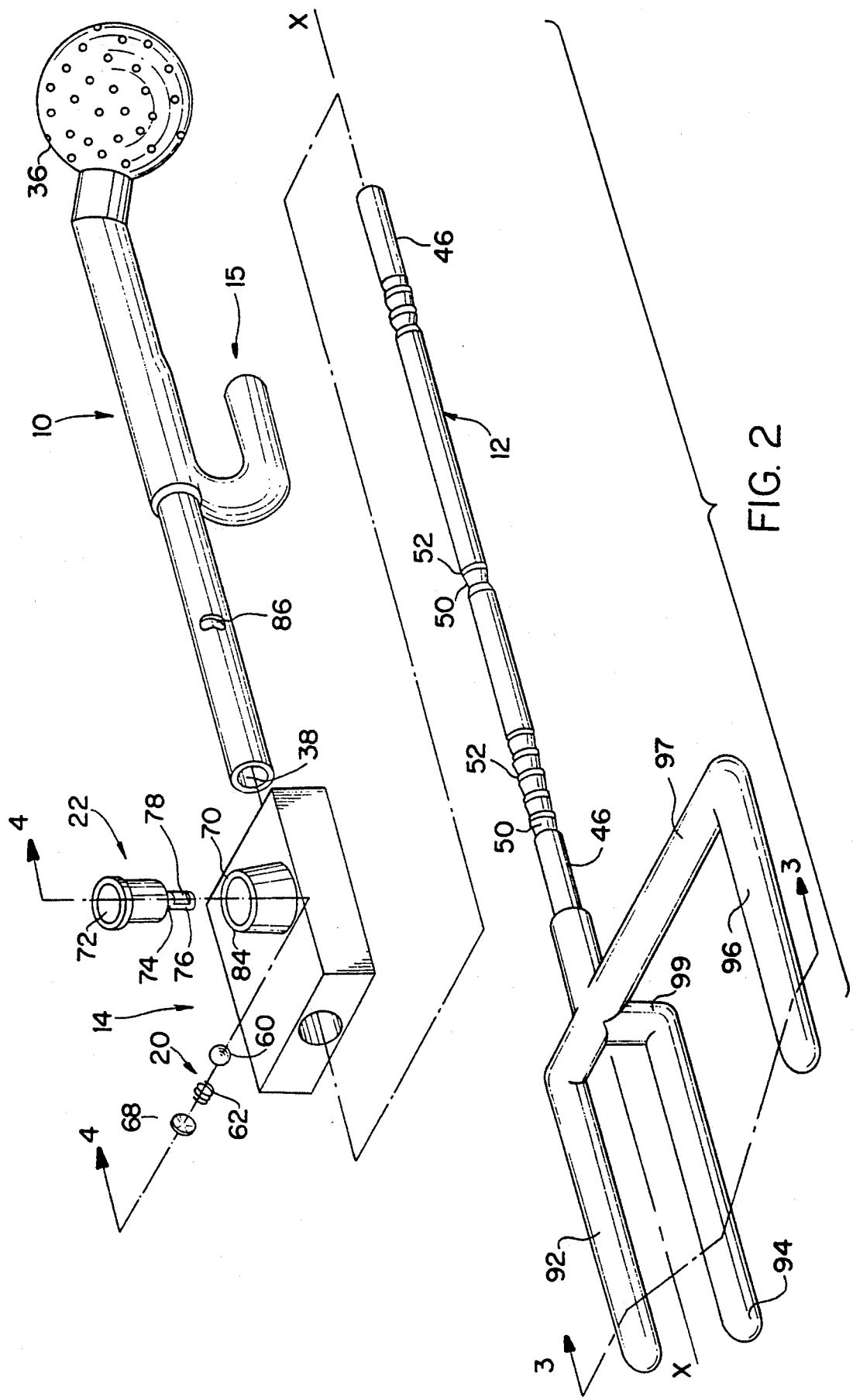
FIG. 2 is a partial exploded perspective view of an anti-theft device for vehicle steering wheels according to the present invention
Figure 3:
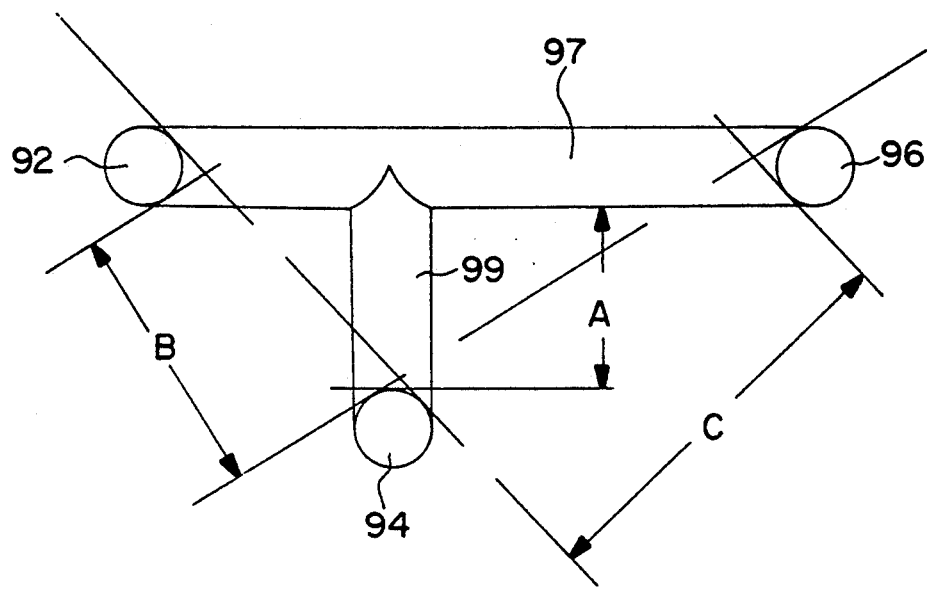
FIG. 3 is a section view taken along the line 3—3 in FIG. 2.
Figure 4:
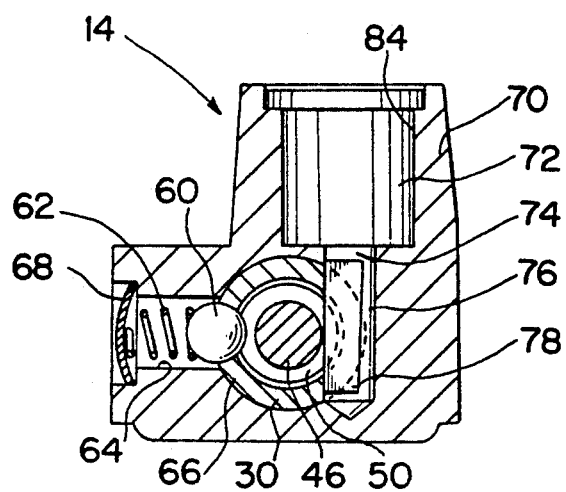
FIG. 4 is a section view taken along the line 4—4 in FIG. 2.

FIGS. 1–4 illustrate the distinctions between a known embodiment of anti-theft device (FIGS. 1 and 4) and an anti-theft device according to the present invention (FIGS. 2–4). Both include an elongated tubular member 10, an elongated solid member 12 which is configured and positioned to coaxially slide in telescopic manner with respect to tubular member 10, and a housing 14. Both engage diametrically opposite points around the circumference of a steering wheel SW from the inside thereof. Both include a locating mechanism 20 and a locking mechanism 22 within the housing 14 to position and lock the solid member 12 with respect to the tubular member 10 at any one of a plurality of positions. Both include an extension 36 beyond the circumference of the steering wheel SW which is adapted to contact an interior element of the vehicle, blocking rotation of the steering wheel SW, thereby inhibiting vehicle steering.

Specifically, the tubular member 10 includes an elongated tube 30 with a central passage 38 of circular cross-section. The solid member 12 includes an elongated rod 46 of circular cross-section which is slightly smaller than the central passage 38 to enable the rod 46 to telescopically move freely within central passage 38. Annular grooves 50, transverse to the axis of elongation of rod 46, are provided along a substantial portion thereof. The grooves 50 are generally semi-circular and axially spaced along rod 46 so as provide intermediate lands 52. The housing 14 is formed around the tube 30 so that central passage 38 also extends through the housing 14.

The locating mechanism 20 includes a spherical bearing 60 and a biasing spring 62 within a bore 64,66 through the housing 14 and into the central passage 38. Spring 62 is confined by a retaining plate 68 within the bore 64,66 such that the bearing 60 is biased towards, and partially projects into the central passage 38. The locking mechanism 22 includes a boss 70 laterally off-center with respect to the central passage 38, a conventional key lock 72, and a locking member 74. Locking member 74 is generally cylindrical in shape and includes a semi-circular arcuate surface 76 cooperatively configured with respect to the grooves 50, and a flat surface 78. A passageway 84 of varying diameters goes through the boss 70 and into the housing 14, forming an intersection 86 with the tube 30. When rotated by lock 72 to a first position, the arcuate surface 76 on locking member 74 projects through the intersection 86 and interferes with one of the grooves 50, restricting relative telescopic movement between the tubular member 10 and the solid member 12. When rotated to a second position, Generally 180° from the first position, the flat surface 78 does not project through the intersection 86, permitting relative telescopic movement between the tubular member 10 and the solid member 12. By orienting the bore 64,66 and the passageway 84 in a common plane, the locating mechanism 20 ensures the locking mechanism 22 of alignment between the arcuate surface 76 and a groove 50. When the flat 78 of the locking member 74 is oriented toward the central passage 38, solid member 12 can move telescopically within the passage 38 of the body member 10 by overcoming the ratcheting effect of the spherical ball 60 engaging the grooves 50. In this unlocked condition, solid member 12 is telescopically moved out of the tubular member 10 until the interior circumference of the steering wheel SW is engaged. Locating mechanism 20 indicates an advantageous elongated position whereupon the locking mechanism 22 is rotated to lock the longitudinal distance between the tubular member 10 and the solid member 12 (i.e. the position with the maximum number of grooves 50 therebetween).

In the known embodiment (FIG. 1), hooks 16,18 are provided on the tubular member 10 and the solid member 12, respectively. The hook 16 is a length of standard pipe vent or otherwise formed into a U-shaped configuration and welded to the tube 30. The hook 18 is case-hardened steel formed by fixedly securing a generally L-shaped member 18 to the solid member 12. Lateral spacing between arms of the U-shaped hooks 16,18, is arbitrarily selected to accommodate the grip diameter of the steering wheel SW. To avoid the housing 14 interfering with a hub (not shown) of the steering wheel SW, the lateral spacing of the hooks 16,18 tends to be generous. Due to a larger cross-section dimension of the hook 16 with respect to the hook 18, the proximity of the housing 14 to the steering wheel SW, and the ease of swiveling the tubular member 10 with respect to the solid member 12, the solid member 12 is more easily manipulated, as described previously, than the tubular member 10.

According to the present invention (FIGS. 2 and 3), the rod 46 is divided into three projections 92,94,96. The three projections 92,94,96 extend generally parallel with respect to the rod 46, and are connected thereto through links 97,99. Further, the projections 92,94,96 are asymmetrically spaced apart from one another such that a different orthogonal distance A,B,C is obtained between one of the projections 92,94,96 and a proximal of two planes which are tangential with respect to two other of the projections 92,94,96. In operation, the solid member 12 is swivelled with respect to the tubular member 10 to select the orthogonal distance A,B,C which optimally engages the grip diameter of the steering wheel SW. As shown in FIG. 2, at least two of the projections 92, 94 and 96 are positioned at different distances from the axis X—X of the anti-theft device to achieve the different orthogonal distances A, B, C (FIG. 3).

In the prior art (FIG. 1), the blocking member 36 is connected to tube 30 to provide a handle and to cushion impact with interior elements of the vehicle. In the present invention (FIG. 2), the blocking member 36 is reconfigured and obliquely oriented with respect to the elongation axis to improve contact with interior elements, to provide more cushion, and to provide an anatomically correct grip when holding or installing the anti-theft device.

I claim:

1. An elongated anti-theft device for attachment to a plurality of vehicle steering wheels having different circumferences and different grip diameters, said anti-theft device defining an axis in a longitudinal direction and comprising:
    a blocking portion at a first end of said anti-theft device, said blocking portion radially extending substantially beyond said circumferences;
    a first engaging portion at a second end of said anti-theft device, said first engaging portion is divided into at least three projections extending substantially away from said blocking portion, said projections are generally parallel and at least two of said projections are positioned at different distances from said axis; and
    a second engaging portion interposed between said blocking portion and said first engaging portion, said second engaging portion is bifurcated into a primary branch attached to said blocking portion and a secondary branch extending substantially away from said first engaging portion, said secondary branch is generally parallel and spaced apart with respect to said primary branch.

2. The anti-theft device according to claim 1, further comprising:
    telescopic means for varying longitudinal distance between said first engaging portion and said second engaging portion, said telescopic means including a first member coaxial with a second member; and
    lock means for securing the distance between said first engaging portion and said second engaging portion.

3. The anti-theft device according to claim 2, wherein said lock means includes a plurality of circumferential grooves on said first member and a locking member on said second member, said locking member is adapted to interfere with said circumferential grooves.

4. The anti-theft device according to claim 3, further comprising locating means for aligning one of said plurality of circumferential grooves with said locking member, said locating means including a spring.

5. The anti-theft device according to claim 2, wherein said first member is relatively rotatable with respect to said second member.

6. The anti-theft device according to claim 2, wherein said blocking portion extends obliquely with respect to said coaxial first and second members.

* * * * *